W. A. STOLLEY.
ARTIFICIAL BAIT.
APPLICATION FILED JAN. 17, 1921.
1,424,385.  Patented Aug. 1, 1922.
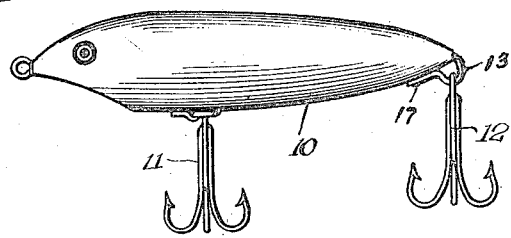
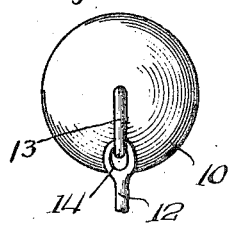
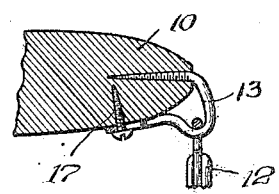
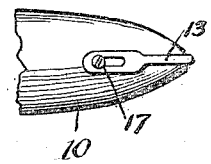
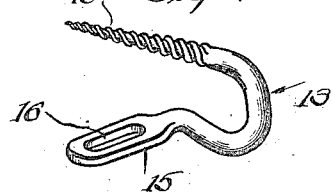
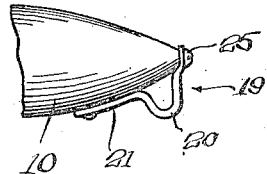
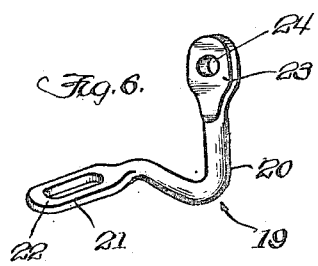
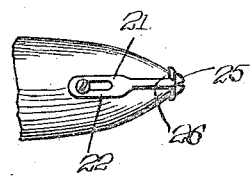
Inventor.
William A. Stolley
By Jones, Addington, Ames & Seibold Attys

UNITED STATES PATENT OFFICE.

WILLIAM A. STOLLEY, OF DOWAGIAC, MICHIGAN, ASSIGNOR TO JAMES HEDDON'S SONS, INC., OF DOWAGIAC, MICHIGAN, A CORPORATION OF MICHIGAN.

ARTIFICIAL BAIT.

1,424,385.

Specification of Letters Patent.

Patented Aug. 1, 1922.

Application filed January 17, 1921. Serial No. 437,931.

*To all whom it may concern:*

Be it known that I, WILLIAM A. STOLLEY, a citizen of the United States, residing at Dowagiac, in the county of Cass and State of Michigan, have invented new and useful Improvements in Artificial Baits, of which the following is a full, clear, concise, and exact description, reference being had to the accompanying drawing, forming a part of this specification.

My invention relates to artificial baits, and more particularly to the rear hook fastening for an artificial bait.

In artificial baits of the type comprising a wooden plug with a number of hooks secured thereto, it has heretofore been common to secure the rear hook to the plug by means of a screw-eye screwed axially into the rear end of the plug. With this form of construction, however, it has been found that in casting the bait the eye of the hook is apt to ride up on the upper half of the screw-eye and become caught in this position, so that when the bait lands in the water and is drawn therethrough the rear hook is caught in improper position, in which position it prevents the proper motion of the plug in the water, and in which position also the points of the hook are not properly presented for catching the fish.

One of the objects of my invention is to provide a fastening for the rear hook of an artificial bait which will prevent the rear hook from being caught in an improper position.

Further objects will appear from the detailed description to follow and from the appended claims.

In the drawings in which two embodiments of my invention are shown—

Fig. 1 is a side elevation of an artificial bait;

Fig. 2 is a rear elevation of the bait shown in Fig. 1;

Fig. 3 is a vertical axial section through the rear end of the bait;

Fig. 4 is a bottom plan view of the rear end of the bait;

Fig. 5 is a perspective view of the rear hook fastening;

Fig. 6 is a perspective view showing a different form of rear hook fastening;

Fig. 7 is a bottom plan view of an artificial bait showing the rear hook fastening of Fig. 6; and Fig. 8 is a side elevation of the rear portion of an artificial bait showing the rear hook fastening of Fig. 6.

Referring first to the construction shown in Figs. 1 to 5 inclusive, the artificial bait shown therein comprises a body 10 which may be of wood and which may be suitably ornamented if desired, and a plurality of hooks 11 and 12, secured to the body 10. The bait may, if desired, be constructed so that it will float when at rest, and may be shaped so as to have any desired motion in the water calculated to attract the fish. The hook 11 may be secured to the body 10 in any usual or suitable manner, for instance as shown in the patent to Charles Heddon, No. 1,276,062, dated August 20, 1918, fish lures.

The rear hook fastening, best shown in Fig. 5, comprises a piece of formed wire 13 passing through the eye 14 of the rear hook 12. This formed wire 13 has its middle portion bent to form a U-shaped portion for engagement with the hook-eye 14, and has one end portion 15 flattened for engagement with the body 10 and has its other end portion formed as a screw to screw axially into the rear end of the wooden body 10. The flattened portion 15, which engages the lower surface of the body 10 is provided with a slot 16 through which a screw 17 is inserted, the screw 17 being screwed into the body 10. The screw portion 18 is screwed axially into the wooden body 10, until the U-shaped portion 13 is in proper position, when the screw 17 is inserted through the slot 16 and screwed into the body 10. The shape of the formed wire 13 is such that it can be readily made by automatic machinery so that it can be purchased in quantities.

The slot 16 does away with the necessity for any great accuracy in locating the hole for the screw 17.

The shape of the formed wire 13 and its relation to the body 10 is such that it is impossible for the hook to get caught up in an improper position, as in the type of fastening in which the hook is secured by means of an ordinary screw-eye into the rear end of the bait.

The form of my invention shown in Figs. 6, 7 and 8 is similar in function to the form just described. It comprises a piece of wire 19 (Fig. 6) having its middle portion bent to form a U-shaped portion 20, and having one end 21 flattened for engagement with the body 10, and apertured for the reception of a screw for securing it to the body, and its other end flattened for engagement with the end of the body 10 of the bait, and apertured for the reception of a screw to be screwed axially into the body 10. The flattened portion 21 which engages the lower surface of the body 10 is provided with a slot 22 through which the screw 17 is inserted, and screwed into the body 10. The flattened portion 23 is apertured at 24 for the reception of a screw 25 which is screwed axially into the body of the bait 10. The rear end of the bait may be flattened off as indicated at 26 to afford a flat surface for engagement with the flattened portion 23. The engagement of the flattened portions 21 and 23 with the body of the bait supports the fastening firmly against any tendency to be twisted or racked out of position. The shape of the formed wire 19 is such that it can be readily purchased in quantities.

This application is a continuation so far as common subject matter is concerned of my copending application Serial No. 251,365, filed August 26, 1918, allowed September 13, 1920.

It will be seen that the anchorage for this rear hook fastening is much stronger and more secure than the ordinary rear hook fastening, which is a screw-eye screwed axially into the rear end of the body and which can easily become unscrewed or even pulled out. In the present form of fastening, there are two screw members which extend substantially at right angles to each other. There is no force tending to unscrew the lower screw, and any force tending to unscrew the axial screw member is resisted by the lower screw.

Having thus described my invention, what I claim as new and desire to secure by Letters Patent of the United States is:

1. An artificial bait comprising an elongated body, a rear hook, and means for so securing said rear hook to said body that the shank of the hook will be prevented from becoming entangled with the securing means, comprising a metallic fastener having a U-shaped portion lying substantially in a vertical plane through the body and located underneath and at the rear end of said body, the rear part of said U-shaped portion being at such an angle that the hook can swing to a position in which the shank is parallel to the axis of the body, the fastening being located so near the rear end of the body that the points of the hook will clear the rear end when the shank of the hook is parallel to the axis of the body.

2. An artificial bait comprising an elongated body, a rear hook, and means for so securing said rear hook to said body that the shank of the hook will be prevented from becoming entangled with the securing means, comprising a metallic fastener having a U-shaped portion for engagement with the eye of the hook, said U-shaped portion being located underneath the rear end of the body and so close to the rear end that the points of the hook will clear the body when the shank of the hook is parallel to the axis of the body.

3. An artificial bait comprising an elongated body, a rear hook, and means for so securing said rear hook to said body that the shank of the hook will be prevented from becoming entangled with the securing means, comprising an integral metallic member having a U-shaped member for engagement with the eye of the hook, and a screw-threaded shank portion, said U-shaped portion being located underneath the rear end of the body, and so close to the rear end that the points of the hook will clear the body, when the shank of the hook is parallel to the axis of the body, said screw-threaded shank portion being screwed axially into the rear end of said elongated body.

4. An artificial bait comprising an elongated body, a rear hook, and means for so securing said rear hook to said body that the shank of the hook will be prevented from becoming entangled with the securing means, comprising an integral metallic fastener having a U-shaped portion, and a flattened apertured portion, said U-shaped portion being located underneath the rear end of the body and so close to the rear end that the points of the hook will clear the body when the shank of the hook is parallel to the axis of the body, said screw-threaded shank being screwed axially into the rear end of said elongated body, said flattened portion lying against the rear lower portion of the body, and a screw extending through said aperture and extending into said body.

In witness whereof, I have hereunto subscribed my name.

WILLIAM A. STOLLEY.